United States Patent
Kroll et al.

(10) Patent No.: US 10,441,989 B2
(45) Date of Patent: Oct. 15, 2019

(54) METHOD FOR MANUFACTURING A LINE COMPONENT

(71) Applicant: Liebherr-Aerospace Lindenberg GmbH, Lindenberg (DE)

(72) Inventors: Lothar Kroll, Dresden (DE); Frank Schubert, Marienberg (DE); Stefan Demmig, Chemnitz (DE); Sebastian Blümer, Chemnitz (DE); Alexander Altmann, Immenstadt (DE); Camille Kunzi, Ravensburg (DE); David Hölzler, Oberstaufen (DE); Gerhard Hummel, Bremen (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 552 days.

(21) Appl. No.: 15/208,991

(22) Filed: Jul. 13, 2016

(65) Prior Publication Data
US 2017/0014887 A1   Jan. 19, 2017

(30) Foreign Application Priority Data
Jul. 14, 2015   (DE) .................. 10 2015 009 153

(51) Int. Cl.
*B24B 1/00*   (2006.01)
*B21D 26/035*   (2011.01)
(Continued)

(52) U.S. Cl.
CPC .......... *B21D 26/035* (2013.01); *B22F 3/1055* (2013.01); *B22F 3/24* (2013.01);
(Continued)

(58) Field of Classification Search
CPC ..... B21D 26/035; B24B 31/116; B24C 1/083; B08B 3/04; B08B 9/0321; B33Y 80/00;
(Continued)

(56) References Cited

U.S. PATENT DOCUMENTS 5,085,244 A * 2/1992 Funk ................ B08B 9/0321
                                                    134/102.1
5,195,276 A * 3/1993 Vennerholm ............ B08B 3/04
                                                       134/7
(Continued)

FOREIGN PATENT DOCUMENTS

DE          6004042 U1    5/1980
DE    102009000538 A1    8/2010
(Continued)

OTHER PUBLICATIONS

German Search Report for Corresponding German Application No. 10 2015 009 153.0 dated Mar. 23, 2016.

*Primary Examiner* — David B Jones
(74) *Attorney, Agent, or Firm* — Arent Fox LLP (57) ABSTRACT

According to the manufacturing method of the invention the line component, in particular an additively fabricated line component, comprises a line element for conducting a fluid from a first opening to a second opening, and a line branching connected with the line element for conducting the fluid to a third opening, wherein an outer region of the line component is designed load-compliant by means of a numerical optimization program and thereby includes a multitude of irregular topological structures in its outer region. In the manufacturing method of the line component a notch is incorporated on the inside of the line element, which serves to relieve a tension in a highly loaded state of the line component or the line element, a particle-filled gas stream is guided through the interior of the line component, in order to smooth the inside of the line component and/or the line component is subjected to a pressurization, in order to produce a plastic deformation on an inner surface of the line component.

20 Claims, 5 Drawing Sheets

(51) Int. Cl.
*B33Y 10/00* (2015.01)
*B33Y 80/00* (2015.01)
*B22F 3/105* (2006.01)
*B22F 3/24* (2006.01)
*B22F 5/10* (2006.01)
*F16L 41/02* (2006.01)
*B22F 5/00* (2006.01)

(52) U.S. Cl.
CPC ............ *B22F 5/10* (2013.01); *B33Y 10/00* (2014.12); *B33Y 80/00* (2014.12); *F16L 41/021* (2013.01); *B22F 2005/005* (2013.01); *B22F 2998/10* (2013.01); *Y02P 10/295* (2015.11)

(58) Field of Classification Search
CPC .... B33Y 10/00; B22F 3/24; B22F 5/10; F16L 41/021
USPC .......................................................... 72/53
See application file for complete search history.

(56) References Cited

U.S. PATENT DOCUMENTS

| | | | | |
|---|---|---|---|---|
| 6,503,126 | B1 | 1/2003 | Rhoades | |
| 6,935,927 | B2* | 8/2005 | Ashizawa | B24C 1/083 451/36 |
| 7,637,800 | B2* | 12/2009 | Hamann | B24B 31/116 134/22.12 |
| 7,905,216 | B2* | 3/2011 | Kutsukake | F02M 55/025 123/456 |
| 2014/0305529 | A1 | 10/2014 | Kroll et al. | |

FOREIGN PATENT DOCUMENTS

| | | |
|---|---|---|
| DE | 102013203936 A1 | 9/2014 |
| DE | 102013015038 A1 | 3/2015 |
| EP | 0987085 A1 | 3/2000 |
| EP | 1186378 A2 | 3/2002 |
| FR | 1064606 A | 5/1954 |

* cited by examiner

METHOD FOR MANUFACTURING A LINE COMPONENT

This invention relates to the manufacture of a line element, in particular an additively fabricated line element.

In recent years, aviation and aerospace technology more and more has relied on the additive fabrication of complex components. In contrast to the conventional machining treatment of metallic elements, only those material quantities are used in an additive fabrication which have a hydraulic or structural-mechanical function. In particular in the case of a valve block for flight control actuators and landing gear systems, the complex line routing prevents that all those material quantities which do not have a structural-mechanical function are removed by a machining method. In contrast thereto, this kind of unnecessary material accumulations is prevented by an additively fabricated or also generatively produced line element. The resulting weight reduction is a further advantage for the use of additively fabricated elements in the aviation and aerospace technology.

From the practical use of generatively fabricated, complexly branched fluid-carrying line systems it is known that the same have a tendency to fail under dynamic load. Reasons for this are considered to be a lack of surface quality and/or a lower dynamic strength of the metallic material produced by an additive manufacturing method. This observation applies for all currently known additive manufacturing methods such as Selective Laser Melting, SLM, Selective Laser Sintering, SLS, or Electron Beam Melting, EBM, which all can be used for the generative fabrication of a metallic component. In everyday language, the additive fabrication or the generative production of a material also is referred to as "3D printing."

The aforementioned problems are solved by a method according to independent claim 1 or by a combination with one or more of the independent claims.

According to the manufacturing method of the invention the line component, in particular an additively fabricated line component, comprises a line element for conducting a fluid from a first opening to a second opening, and a line branching connected with the line element for conducting the fluid to a third opening, wherein an outer region of the line component is designed load-compliant by means of a numerical optimization program and thereby includes a multitude of irregular topological structures in its outer region. In the manufacturing method of the line component a notch is incorporated on the inside of the line element, which serves to relieve a tension in a highly loaded state of the line component or the line element, a particle-filled gas stream is guided through the interior of the line component, in order to smooth the inside of the line component, and/or the line component is subjected to a pressurization, in order to produce a plastic deformation on an inner surface of the line component.

The component comprises a line element for conducting a fluid from a first opening to a second opening, and a line branching connected with the line element for conducting the fluid to a third opening. Preferably, the line component is formed of a metallic material. The line branching is connected with the line element and provides for an alternative flow path for a fluid flowing in the line element. As for the inflow and outflow of the fluid the line component includes two openings and a flow channel connecting these openings, i.e. the line element, the line branching is arranged on the line element such that the flow channel includes a connection to a third opening. Due to the line branching it hence is possible to combine two fluid flows independent of each other and have the same flow out of the line component through a common opening, or to introduce a common fluid flow into the line component and have the same flow out separately through the two other openings.

The notch on the inside of the line element serves to relieve a tension of the line element in a highly loaded state. The notch describes a groove which represents a locally limited recess towards the surrounding level of the inside, but does not penetrate through a wall thickness of the line element. The inside of the line element describes the regions of a line element which when conducting a fluid can get in contact with the same.

In the simplified case of an additively fabricated line element, the same for example has a cylindrical base body whose shell surface is penetrated by a line branching likewise formed approximately cylindrical. It is clear that when conducting a fluid, the inside of the basic cylindrical shapes gets in contact with said fluid.

Providing the notch on the inside of the line element can redirect the flux of force that is generated when the line element is charged with a fluid under pressure, and thus contributes to the decrease of notch tensions in line branchings.

To further improve the continuous-use properties of the line component it is provided that an outer region of the line component is designed load-compliant by means of a numerical optimization program and thereby includes a multitude of irregular topological structures in its outer region.

By means of the numerical optimization program the state of the line component upon supply of a fluid under high pressure is simulated and an optimum outer shape of the line component is derived from these calculations. This optimum design is reflected in a multitude of irregular topological structures in the outer, region. With the aid of the numerical optimization program, the constructive design of the line component accordingly is effected, so that the external shape can be designed load-compliant. This procedure in particular is advantageous when the inner structures of the line component are subject to strong geometrical constraints and permit no or only minor topological changes.

Due to the provision of the irregular structures in the outer region, the regions particularly susceptible to pressure or the regions of the line component loaded particularly strongly upon introduction of a fluid under great pressure are reinforced in their structure by a thicker design, whereby the continuous-use property of the line component is improved. Other less strongly loaded regions of the line component, on the other hand, are designed thinner, in order to use as little material as possible.

In the manufacturing method the invention furthermore discloses the feature that for smoothing the inside of the line component a particle-filled gas stream is guided through the interior of the line element.

By smoothing the surface roughness, the mechanical loadability of the line component is increased. According to the invention the inside of the line component is smoothed by means of a particle-filled gas stream which is guided through the interior of the line component. For example, a gas stream provided with particles is introduced at a first opening of the line component and guided out at a second opening of the line component. As on their way from the first opening to the second opening the particles strike against the inner wall of the line component, there is effected a removal of powder or granulate quantities possibly adhering thereto, which originate from the fabrication process of the generative production. In addition, a reduced surface roughness is effected by the collision of the particles with the inner wall of the line component. An inside of the line component smoothed in this way allows a greater mechanical load, such as when supplying a fluid under pressure.

In addition, the present invention furthermore can include the feature that the line component is subjected to a pressurization, wherein on an inner surface of the line component the pressurization lies above the yield point of the material of the line component. Preferably, the pressurization is effected by introducing a medium into the line component.

Due to the pressurization of the line component by means of the medium, such a high material load is achieved in a region on the inside of the line component that this region is exposed to a pressure which lies above the yield point of the material. The pressure hence is so great that the material is deformed. In the case of additively fabricated components residual compressive stresses can be produced thereby, which positively influence the continuous-use properties.

Hence a medium is introduced into a line component, which in the interior of the line component generates such a great pressure that the yield point of the material is exceeded on the inside of the line component. Typically, the material load in the surface of the component facing pressure lies above the yield point of the material. It furthermore is advantageous when the pressure range is chosen such that the surface of the component facing away from the pressure side largely is deformed linear-elastically.

Preferably, the line component (2) is fabricated additively in that in a predetermined region a particle-shaped material is piled up on a base layer of the line component to be fabricated, and the particle-shaped material piled up is heated by means of a heat source such that the particles of the material combine with each other and/or with the base layer within predetermined dimensions. It is clear to the skilled person that these production steps can be repeated one after the other as often as desired, until a blank or a blank segment is completed fully or in part.

Any generatively produced element which is suitable for conducting a fluid is regarded as additively fabricated line component.

Preferably, the notch is formed such that the notch substantial extends along a flow direction of the line element and/or substantially along the longitudinal direction of the line element. There is observed a particularly effective reduction of tensions in the line component when a highly pressurized fluid is introduced or conducted.

According to another advantageous, optional feature of the invention it is advantageous when the notch of the line component extends substantially linearly. There is likewise achieved a reduction of the occurring tensions.

It also is advantageous when the notch substantially has a shape which corresponds to a part of an external cylinder surface. Preferably, the notch is formed such that it can be formed by pressing a cylinder body into the inside of the line element. The shape of the recess easily can be described with reference to a geometrical cylindricity, which is pressed into the inside of the line element to a certain extent. The impression depth of the geometrical cylinder need not necessarily by half of the cylinder diameter, but can be less or more than half of the cylinder diameter. There is obtained an approximately trough-shaped or barrel-shaped recess. It is clear to the skilled person that to form such notch it is of course not necessary to first form a homogeneously extending inside of the line element, but that the notch can be taken into account already during the additive fabrication. The advantageously used barrel shape or the trough-shaped recess of the notch can also be provided directly during the additive fabrication.

In addition, it is advantageous when the notch partly or entirely is arranged in an inner circumferential region of the line element, in which the line branching from the line element also is located. This feature hence describes a local relation between the position of arrangement of the notch and the line branching of the line element. Inner circumferential region here is understood to be the inner region extending transversely to the flow direction of the line element, in which a connection to the line branching is present or which overlaps with the opening in the line element for the branching. In the simplified example of a cylindrical line elements this means that the notch wholly or partly is arranged at the same height as a recess for line branching on the inside of the line element. For example, the notch is arranged directly on the inside of the line element opposite the line branching. This feature also describes that the notch should not lie completely above or below the line branching.

According to a further advantageous modification of the invention the notch wholly or partly is formed in a region adjoining the line branching, which with respect to a reference straight line defined by the geometrical center of gravity of the inner cross-sectional area of the line element and the middle of the recess of the line element for the line branching includes an angle ≤75°, preferably an angle ≤45°, more preferably an angle ≤15° with a middle of a notch. The middle of the notch likewise is determined in the cross-sectional view. Instead of the middle of the notch, the angle also can be determined with reference to the deepest point of the notch (as seen in the cross-sectional view).

By means of this feature the arrangement position of the notch is fixed with respect to the recess of the line element, which defines the line branching. In a cross-sectional view of the line element at the height of the recess for the line branching a middle of the cross-sectional area of the line element is utilized for flowing of a fluid, in order to define the proximity of the notch to the line branching. In this cross-sectional view, in which there is also determined the middle of the cross-sectional area of the line element for conducting fluid, the middle of the recess of the line branching is determined as well. These two points (middle of the cross-sectional area of the line element for conducting fluid and middle of the recess which forms the line branching) form a straight line at which an angle is applied from the middle of the cross-sectional area of the line element, which defines a region on the inside of the line element in which the notch is arranged wholly or in part. The angle is ≤75°, preferably ≤45° and more preferably ≤15°. The arrangement of the notch within this region in the vicinity of the channel branching leads to a particularly effective decrease of tensions on introduction of a fluid under high pressure into the line component, as the notch is arranged in the vicinity of the line breaching.

Preferably, the outer region of the line component is an outer circumferential region Furthermore preferably, the outer circumferential region provided with a multitude of, irregular topological structures is the region of a line element for conducting a fluid from a first opening to a second opening, wherein the line component also includes a line branching connected with the line element for conducting the fluid to a third opening, and the line branching likewise is arranged out of the circumferential region.

Accordingly, the line component comprises a line branching connected with the line element, which branches off from a connecting region of the line element, wherein the irregular topological structures appear in the outer circumferential region of the line element, which coincides with the connecting region. Connecting region here is understood to be the region of the line element which is connected with the line branching.

As further feature improving the continuous-use properties of a line component, which can be combined with the features described above, it is proposed to design an inner region of the line component load-compliant by means of a numerical optimization program, so that the same thereby includes a multitude of irregular topological structures in its inner region.

When geometrical changes in the interior of the line component are admissible, it is advantageous when a modification of this topology is effected. Preferably, these changes in particular concern regions in which geometrical discontinuities exist, such as channel branchings or regions of intersection. The configuration of the transition zones between at least two basic structures focuses on the reduction or redirection of mechanical tensions in component regions loaded less. This is effected with the aid of a numerical optimization program, in which the load of the line component upon supply of a fluid under high pressure is simulated. With reference to the results gained therefrom the arrangement of a multitude of irregular topological structures in the inner region of the line component is obtained.

Preferably, the inner region of the line component is an inner circumferential region.

According to a further optional modification of the line component, the same comprises a line element for conducting a fluid from a first opening to a second opening and a line branching connected with the line element for conducting the fluid to a third opening. The irregular topological structures appear in the inner circumferential region of the line element, which coincides with the outer connecting region of line branching and line element. The topological structures are concentrated on the portion of the line element which due to the line branching is exposed to particular forces upon supply of a fluid under pressure.

Typically, the production of an additively fabricated line component is effected by Selective Laser Melting, Selective Laser Sintering or Electron Beam Melting. The basic material of the line component is provided in granular form or powder form and liquefied by means of a laser or an electron beam, so that it combines with an adjoining, likewise liquefied granulate. This results in a first layer of the line component produced by additive fabrication. In a further step, this first layer is lowered in its height by the amount and covered with granulate. Subsequently, a repetition of the above-mentioned steps is effected, so that several layers of a heated granulate are combined with each other. After completion of the additively fabricated line component, the granulate or powder still can adhere to the functional surfaces in edge regions. Due to the fabrication in layers, a line component having a large surface roughness is obtained.

It therefore is advantageous when the particles of the gas stream used for smoothing have an abrasive and/or compacting effect, in order to homogenize the removal of material on the inside of the line component. This reduces the time in which the particle-filled gas stream must be guided through the interior of the line component and thus achieves the desired result in a shorter time.

According to a further modification of this method, the particle-filled gas stream is supplied into a region of the lowest flow velocity of the line component. For example, the line component includes a line element for conducting a fluid from a first opening to a second opening, and a line branching connected with the line element for conducting the fluid to a third opening. The particle-filled gas stream then is introduced at that opening which according to fluid mechanics has the lowest flow velocity.

Preferably, the flow direction of the particle-filled gas stream is changed when carrying out the method, in order to improve the smoothing of the inside of the line component. Accordingly, the direction of entry of the gas stream becomes the output direction and vice versa. The collision areas of the particles present in the gas stream are changed and more effective smoothing is achieved.

For machining a line component with more than one branching, individual flows from at least one to at least one other opening are to be established by means of a pressure difference.

Further particulars and details of the invention will be described with reference to the drawings, in which.

Figure 1:
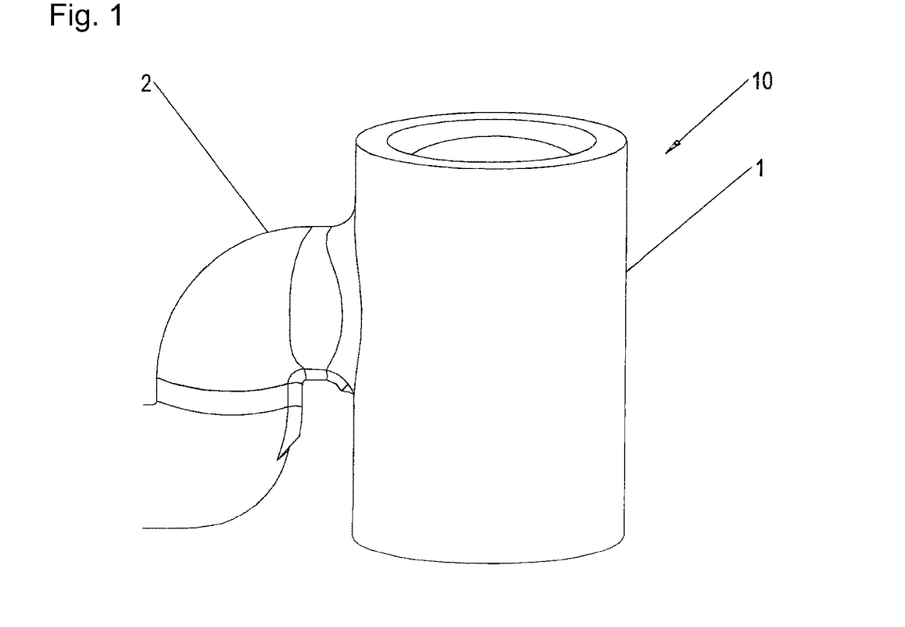
FIG. 1: shows a conventional line component according to the prior art.

FIG. 1 shows a conventional line component 10 which has been manufactured by additive fabrication. There can be seen the line element 1 of the line component 10 which serves for conducting a fluid from a first opening to a second opening, and a line branching 2 connected with the line element 1 for conducting the fluid to a third opening. The basic shape of the line element 1 substantially corresponds to a hollow cylinder which in its shell surface includes a recess for connection with the line branching 2.

Figure 2:
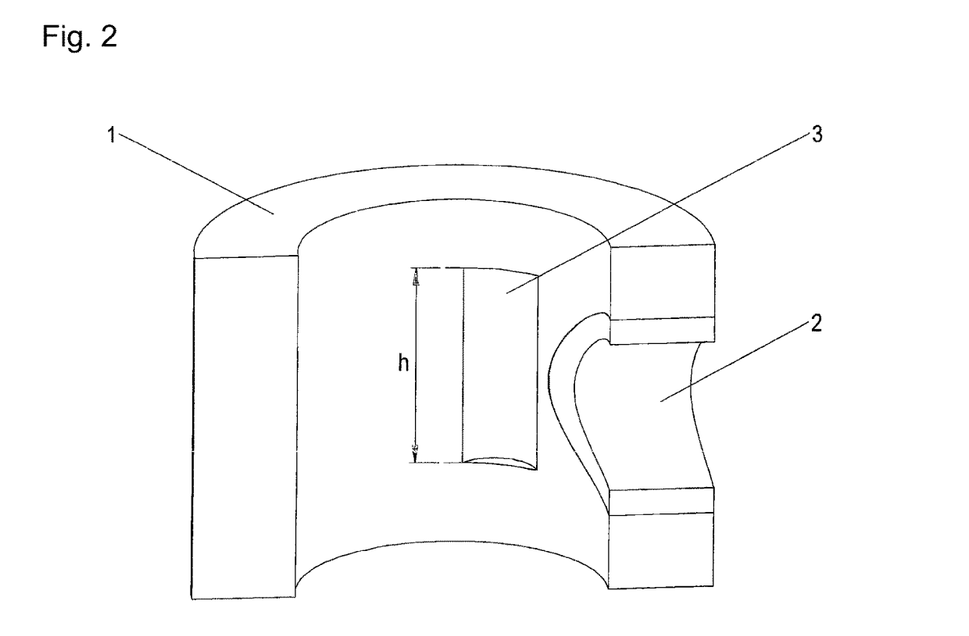
FIG. 2: shows a sectional view of a line component according to the invention with a notch.

FIG. 2 shows a sectional view of a line component 10 according to the invention, in which the line element 1, the line branching 2 and the notch 3 can be seen. The notch 3 extends in direction of a flow direction of a fluid flowing in the line element from the first opening to the second opening. The notch 3 is located close to a line branching 2 and serves to reduce tensions which occur on introduction of a medium under pressure into the line component 10. The length of the notch 3 is designated with h. In the Figure, the notch 3 is a trough-shaped recess which corresponds to a part of an external cylinder surface, wherein the height of the cylinder is h. It is not required that the notch 3 has the shape of a cylinder divided along its axis rotation. This is merely one of several possible variants.

Figure 3:
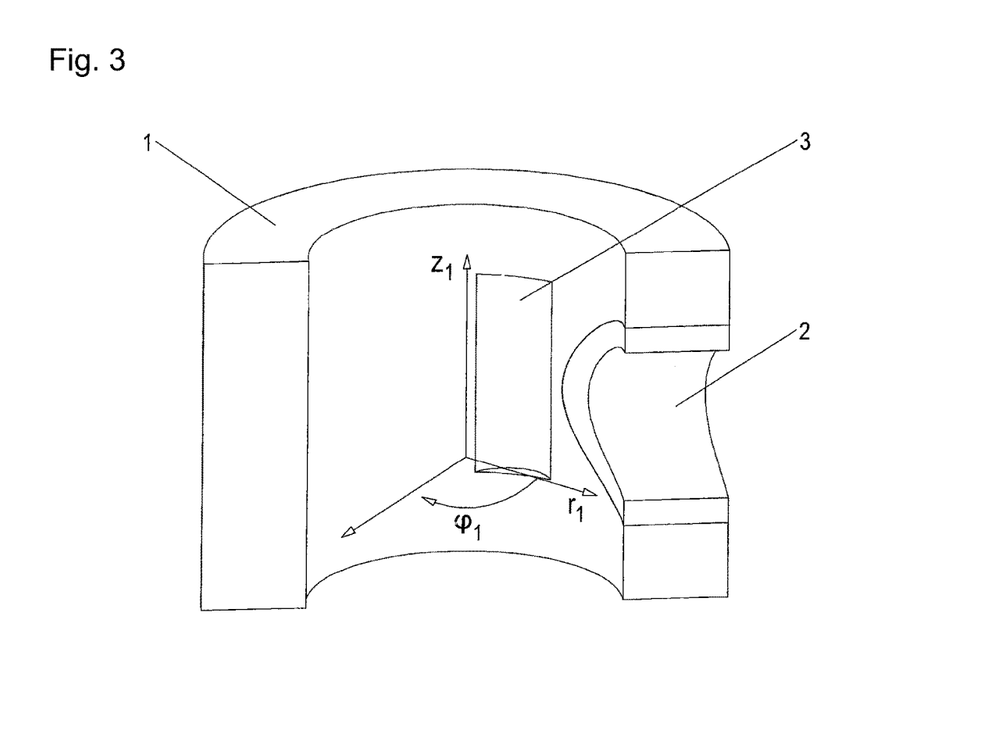
FIG. 3: shows a sectional view of the line component according to the invention with notch, with an illustration of the acting forces upon introduction of a fluid under pressure.

FIG. 3 shows an illustration of the image from FIG. 2 to represent the forces acting when a medium under pressure flows through the line component 10. It can be seen that in the region of the notch 3 areas of high forces (in dark color) appear. It thus becomes clear that the notch absorbs tensions and the continuous-use property of the line component 10 hence is improved. There is also shown a coordinate system proceeding from the axis of rotation of the substantially cylindrical line element 1, by means of which the positioning of the notch 3 in the line element 1 can be described.

Figure 4:
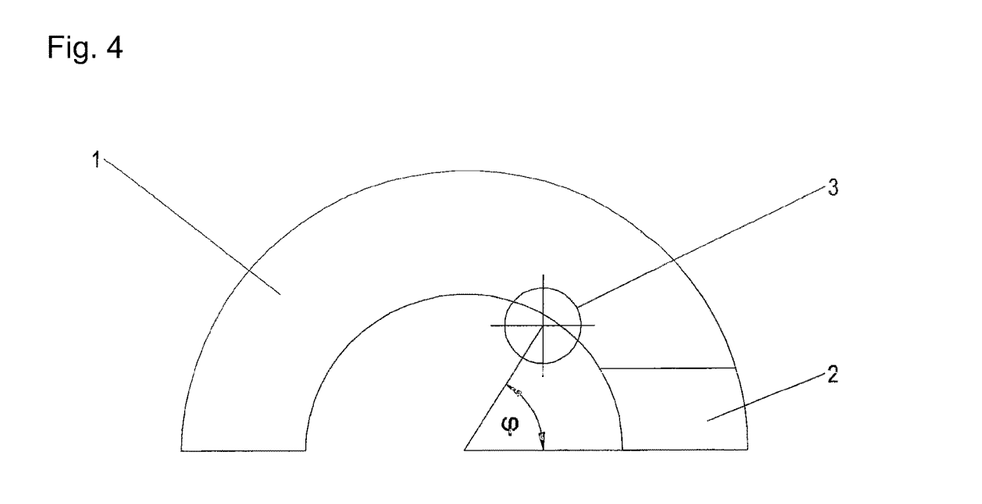
FIG. 4: shows a cross-sectional view of the line component according to the invention with notch.

FIG. 4 shows a partial cross-sectional view of the line element 1, which also comprises an opening area of the line component 10 for the line branching 2 extending therefrom. The Figure only represents the upper half of the cross-sectional view, wherein the lower half of the cross-sectional view preferably can be obtained by reflection on a horizontally extending line.

For definition of a reference straight line 33, two points are fixed in the cross-sectional view. The one is the geometrical center of gravity 31 of the inner cross-sectional area of the line element 1 without taking account of the opening for the line branching. The other one is a center 32 between the two edge regions of the line element 1 as shown in the cross-sectional view, which define the region of transition to the line branching. In the Figure, the reference straight line 33 accordingly extends proceeding from the middle 31 of the circular inner cross-section of the line element 1 in direction of the line branching 2, so that the opening area of the line element is divided approximately centrally for the branching. Proceeding from the geometrical center of gravity 31 of the inner cross-sectional area, a connecting straight line 34, which extends from the middle of the notch 3 to the geometrical center of gravity 31, includes an angle cp. As an alternative reference point instead of the middle of the notch, there can also be used the deepest point of the notch 3 in the cross-sectional views. This angle advantageously should be ≤75°, preferably ≤45°, and more preferably ≤15°. The closer the notch 3 is positioned with respect to the line branching 2, the better can occurring forces be reduced in the case of a pressure load of the line component 10.

The middle of the cross-sectional area of the line element in the case of an irregular shape here is understood to be the geometrical center of gravity of the cross-sectional area. In the illustrated example of a substantially circular cross-sectional area of the line element 1 this is the circle center which lies in the axis of rotation of a basic cylindrical construction.

Figure 5:
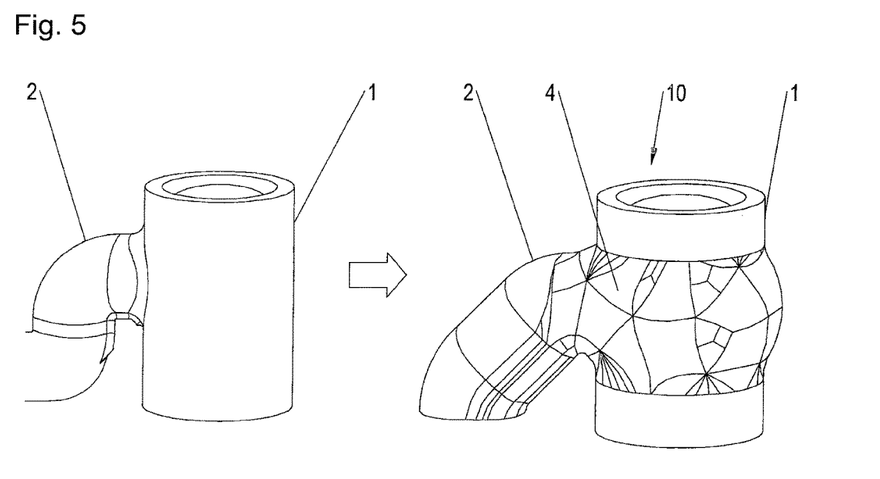
FIG. 5: shows a comparative representation of two line components to identify the line component according to the invention, which includes a multitude of irregular topological structures in its outer region.

FIG. 5 shows a further embodiment for improvement of the continuous-use properties of a line component 10, in which a comparison of a conventionally formed line component with a line component 10 according to the invention can be seen. The line component according to the invention includes an outer region which is designed load-compliant by means of a numerical optimization program. As a result of this numerical optimization, the line component 10 includes a multitude of irregular topological structures in its outer region.

It can be seen in the Figure that the topological structures 4 of the line element 1 are present only in an outer circumferential region which coincides with the connecting region with the line branching 2. This means that the topological structures 4 in particular are arranged in the vicinity of a branching area from the line element 1. The external shape of the line component 10 thereby can be designed load-compliant. This procedure in particular is advantageous when the inner structures are subject to strong geometrical limitations and allow only minor topological modifications.

Figure 6:
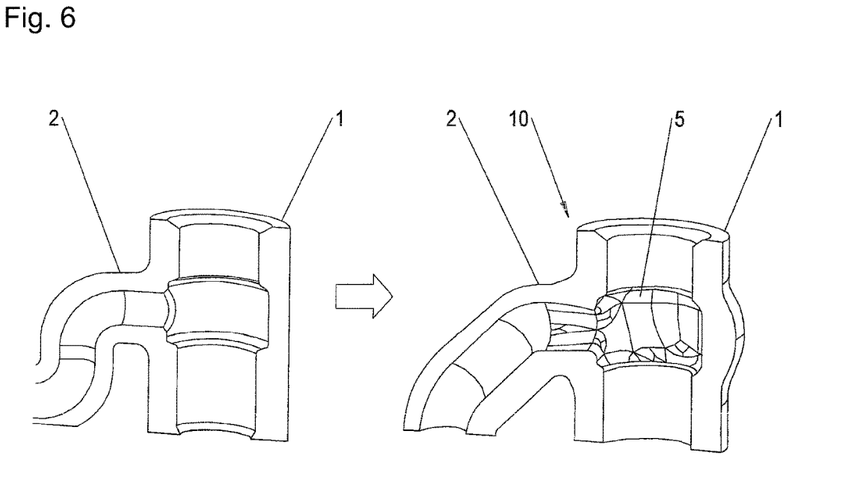
FIG. 6: shows a comparative representation of two line components in a sectional view to identify the line component according to the invention with a multitude of irregular topological structures in its inner region.

FIG. 6 shows a comparison of two additively fabricated line components, wherein one has a conventionally formed inner region and the other one has an inner region formed according to the invention.

The left representation shows the conventionally formed lined component comprising the line element 1 and the line branching 2. The right presentation of FIG. 6 shows the line component 10 according to the invention, in which the inner region of the line component is designed load-compliant by means of a numerical optimization program and thereby includes a multitude of irregular topological structures in its inner region. It can be seen that the inner circumferential region, in which the line branching 2 extends from the line element 1, is provided with the topological structures 5. Due to these topological structures, whose shape is specified by means of a numerical optimization program, the line component 10 has improved continuous-use properties.

Figure 7:
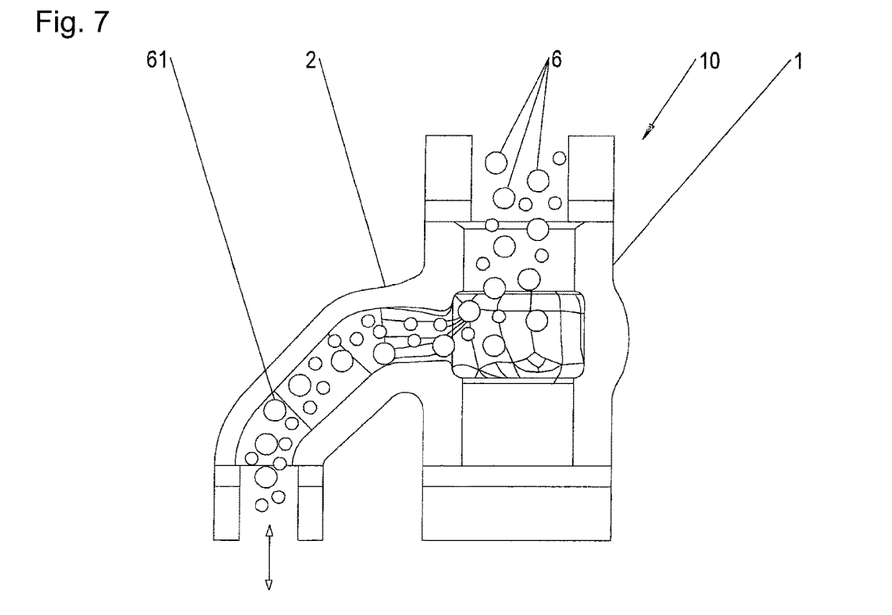
FIG. 7 shows a sectional view of a line component according to the invention during smoothing of the inside by a particle-filled gas stream.

FIG. 7 shows a method step for manufacturing a line component 10 which has a better surface quality and thus a better continuous-use property. The additively produced line component 10, which includes a line element 1 and a line branching 2 branching off therefrom, is charged with a particle-filled gas stream. The line element 1 serves for conducting a fluid and includes a first opening as well as a second opening. From the line element connecting the first and the second opening a line branching 2 branches off, which is connected with a third opening. For smoothing the inner surface of the additively fabricated line component 10 one of the three openings is closed and at one of the other two open openings a particle-filled gas stream is introduced. Flowing of the particle-filled gas stream 6 is realized by means of a pressure difference between the two openings. The particles 61 then move in the gas stream 6 from the one to the other opening and in the process collide with the inner walls of the line component 10. At a sufficiently high speed, the collision of the individual particles 61 with the inner region of the line component 10 leads to smoothing of the inner region. In addition, possibly present granular or powder particles necessary during the additive fabrication, which still adhere to the inner region, are removed, whereby a further smoothing effect can be achieved.

It is advantageous when the flow direction of the particle-filled gas stream 6 can be varied. This means that the direction of introduction of the gas stream is changed so that the opening into which the particle-filled gas stream is introduced now is the opening in which the particle-filled gas stream is blown out. As the particles 61 chiefly collide with other areas of the inner region depending on the direction of introduction into the line component 10, this results in a better smoothing of the inner region and an even better continuous-use property of the line component 10.

Figure 8:
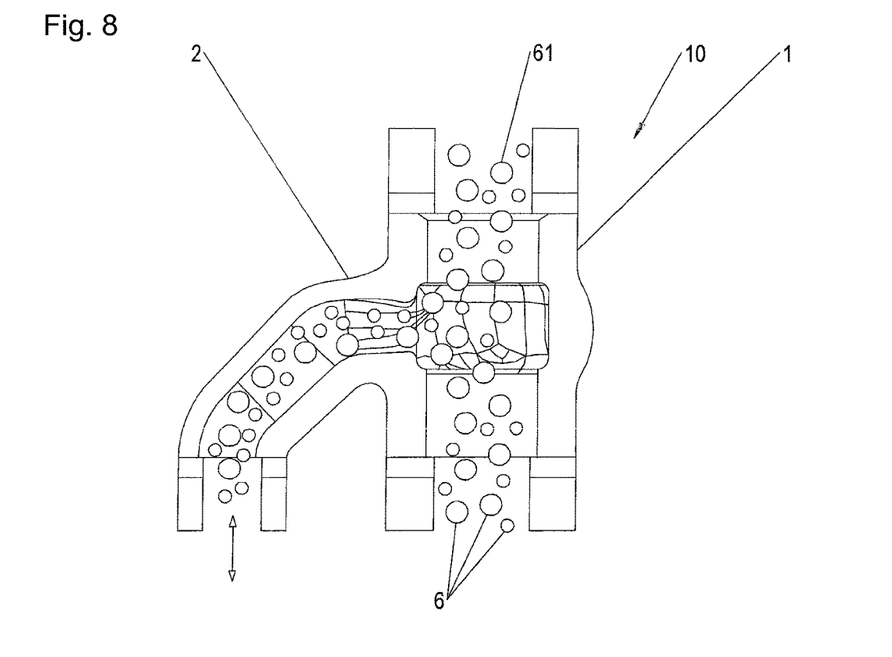
FIG. 8: shows a sectional view of a line component according to the invention during smoothing of the inside by a particle-filled gas stream.

FIG. 8 shows a further alternative to the introduction of the particle-filled gas stream 6, in which none of the total of three openings of the line component 10 is closed. The gas stream 6 is introduced from one of the openings and leaves the line component through the other two openings. Preferably, the line branching 2 here is suitable as introduction opening, so that the particles 61 are blown out of the line component 10 through the two other openings of the line element 1.

What is advantageous is the introduction of the particle-filled gas stream 6 into the line component in a region of the lowest flow velocity. In the Figure, the gas stream 6 hence preferably is introduced through one of the two openings of the line element 1, as the cross-sectional area of the line element 1 in this region is greater than in the region of the opening of the line branching 2.

A further method step, which serves to improve the continuous-use property of the line component, is the introduction of residual compressive stresses into the additively fabricated line component 10.

Figure 9:
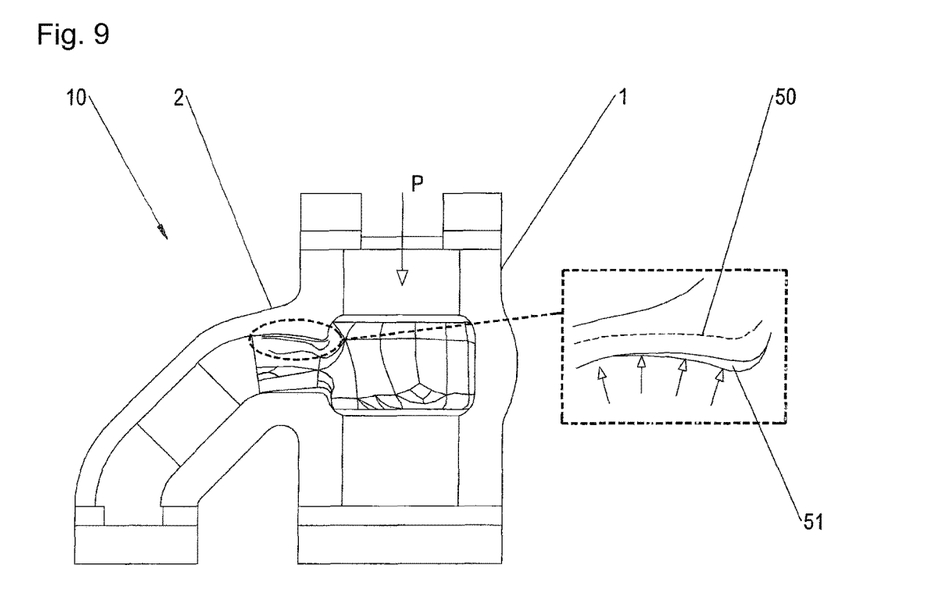
FIG. 9: shows a sectional view of a component according to the invention during a pressurization which lies above the yield point of the material of the line component.

FIG. 9 shows a line element 1 provided with two openings for conducting a fluid as well as a line branching 2 which branches off from the line element 1. After the additive fabrication of the line component 10, two of the total of three openings are closed and from the unclosed opening a medium is introduced into the line component 10 with a particular pressure. The pressure of the medium introduced into the line component 10 is so great that in an inner region it lies above the yield point of the material of the line component 10. In generatively produced fluid-carrying line components residual compressive stresses thus can be generated, which positively influence the continuous-use properties.

FIG. 9 in addition shows an enlarged section of a region which has been pressurized via the medium, which lies above the yield point of the material of the line component 10.

The broken line 50 indicates the original course of the inner region of the line component 10. Reference numeral 51 designates the inner region after application of the method step described above. Preferably, the pressurization of the fluid-carrying line component 10 is effected by means of a medium such that the material load on the surface of the component facing the pressure lies above the yield point of the material. Furthermore preferably, the pressure range is to be chosen such that the surface of the component facing away from the pressure side is deformed largely linear-elastically. Residual compressive stresses thereby can be generated particularly effectively in additively fabricated line components.

All embodiments described with reference to the Figures can be combined with each other with their respective features or with a selection of their respective features.

The invention claimed is:

1. A method for manufacturing a line component for conducting a fluid, the method comprising:
    additively fabricating a line component that includes a line element and a line branching by:
        piling, in a predetermined region, a particle-shaped material on a base layer of the line component to be fabricated; and
        heating up the piled particle-shaped material by means of a heat source such that particles of the particle-shaped material combine with each other and/or with the base layer within predetermined dimensions;
    incorporating a notch on an inside of the line element, the notch serving to relieve a tension in a loaded state of the line component or the line element;
    guiding a particle-filled gas stream through an interior of the line component in order to smooth an inside of the line component; and/or
    pressurizing the line component to produce a plastic deformation on an inner surface of the line component, wherein the line element is configured to conduct a fluid from a first opening to a second opening, wherein the line branching connected with the line element is configured to conduct the fluid to a third opening, and wherein an outer region of the line component is designed load-compliant by a numerical optimization program to include a multitude of irregular topological structures in the outer region.

2. The method according to claim 1, wherein the notch substantially extends along a flow direction of the line element and/or substantially along the longitudinal direction of the line element.

3. The method according to claim 1, wherein the notch is formed to extend substantially linearly.

4. The method according to claim 1, wherein the notch substantially is formed such that it has a shape which corresponds to a part of an outer cylinder surface.

5. The method according to claim 1, wherein the notch partly or entirely is arranged in an inner circumferential region of the line element, in which the line branching from the line element also is located.

6. The method according to claim 1, wherein the notch wholly or partly is arranged in a region adjoining the line branching, which with respect to the geometrical center of gravity of the inner cross-sectional area of the line element includes an angle equal to or less than 75° with respect to a middle of a line branching opening in the cross-section area.

7. The method according to claim 1, wherein the outer region is an outer circumferential region.

8. The method according to claim 1, wherein the line branching is connected with the line element, and wherein the line branching branches off from a connecting region of the line element, and the irregular topological structures appear in the outer circumferential region of the line element, which coincides with the connecting region.

9. The method according to claim 1, wherein an inner region of the line component is designed load-compliant by the numerical optimization program so as to include a multitude of irregular topological structures in the inner region.

10. The method according to claim 9, wherein the inner region is an inner circumferential region.

11. The method according to claim 10, wherein the line branching is connected with the line element, wherein the line branching branches off from a connecting region of the line element, wherein the irregular topological structures appear in the inner circumferential region of the line element, which coincides with the outer connecting region of line branching and line element.

12. The method according to claim 1, wherein the particles of the gas stream have an abrasive and/or compacting effect.

13. The method according to claim 1, further comprising supplying the particle-filled gas stream in a region of a lowest flow velocity of the line component.

14. The method according to claim 1, further comprising changing the flow direction of the particle-filled gas stream.

15. The method according to claim 1, wherein on an inner surface of the line component the pressurization lies above the yield point of the material of the line component.

16. The method according to claim 15, further comprising performing the pressurization by introducing a medium into the line component.

17. The method according to claim 4, wherein the notch substantially is formed such that it has a shape obtained by pressing a cylinder body into the inside of the line element.

18. The method according to claim 1, wherein the notch wholly or partly is arranged in a region adjoining the line branching, which with respect to the geometrical center of gravity of the inner cross-sectional area of the line element includes an angle equal to or less than 45° with respect to a middle of a line branching opening in the cross-section area.

19. The method according to claim 1, wherein the notch wholly or partly is arranged in a region adjoining the line branching, which with respect to the geometrical center of gravity of the inner cross-sectional area of the line element includes an angle equal to or less than 15° with respect to a middle of a line branching opening in the cross-section area.

20. The method according to claim 1, further comprising changing the introduction direction of the gas stream into the output direction of the gas stream.

* * * * *